(12) United States Patent
Medynskiy et al.

(10) Patent No.: US 7,945,854 B2
(45) Date of Patent: May 17, 2011

(54) SYSTEMS AND METHODS FOR THE COMBINATION AND DISPLAY OF SOCIAL AND TEXTUAL CONTENT

(75) Inventors: Yevgeniy Medynskiy, Atlanta, GA (US); Ayman O. Farahat, San Francisco, CA (US); Nicolas B. Ducheneaut, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1234 days.

(21) Appl. No.: 11/590,272

(22) Filed: Oct. 30, 2006

(65) Prior Publication Data

US 2008/0104002 A1 May 1, 2008

(51) Int. Cl.
*G06F 17/24* (2006.01)
*G06F 3/048* (2006.01)
*G06F 3/00* (2006.01)

(52) U.S. Cl. ........ 715/243; 715/852; 715/846; 715/849; 715/764

(58) Field of Classification Search .................. 715/243, 715/852, 846, 849
See application file for complete search history.

(56) References Cited

U.S. PATENT DOCUMENTS

| | | | | |
|---|---|---|---|---|
| 6,035,057 | A * | 3/2000 | Hoffman | 382/159 |
| 6,202,068 | B1 * | 3/2001 | Kraay et al. | 1/1 |
| 6,888,548 | B1 * | 5/2005 | Gallivan | 345/440 |
| 7,571,177 | B2 * | 8/2009 | Damle | 707/102 |
| 7,689,525 | B2 * | 3/2010 | Drucker et al. | 706/45 |
| 2004/0068697 | A1 * | 4/2004 | Harik et al. | 715/513 |
| 2004/0090472 | A1 * | 5/2004 | Risch et al. | 345/853 |
| 2010/0211894 | A1 * | 8/2010 | Jahr et al. | 715/762 |

OTHER PUBLICATIONS

NPL Reference U: Hammond et al. "Social Bookmarking." Copyright: Apr. 2005.*
NPL Reference U: Bielenberg et al; "Groups in Social Software: Utilizing Tagging to Integrate Individual Contexts for Social Navigation"; Copyright: Apr. 16, 2005.*
NPL Reference V: Medynsky et al; Using Hybrid Networks for the Analysis of Online Software Development Communities; Copyright Date: Apr. 27, 2006.*
NPL Reference X: Girgensohn et al; "Flexible Access to Photo Libraries via Time, Place, Tags, and Visual Features." Copyright 2004.*
Graves et al. "Finding CLusters in Network Link Strength Data." Copyright 1998.*
Vishwanath et al. "Technology clusters: Using multidimensional scaling to evaluate and structure technology clusters." Copyright 2006.*
Peter et al. "A novel Algorithm for Central Cluster Using Minimum Spanning Tree." Copyright 2005.*
Hurley. Journal of Computational and Graphical Statistics: Clustering Visualizations of Multidimensional Data. Dec. 1, 2004.*
Medynskiy, Y.; Ducheneaut, N.; Farahat, A., "Using Hybrid Networks for the Analysis of Online Software Development Communities", CHI 2006 Apr. 22-27, 2006, Montreal, Quebec, Canada.

* cited by examiner

*Primary Examiner* — Doug Hutton
*Assistant Examiner* — Soumya Dasgupta
(74) *Attorney, Agent, or Firm* — Fay Sharpe LLP

(57) ABSTRACT

Techniques are presented for determining a corpus of content portions, each content portion associated with at least one element. A first set of feature values is determined for each content portion. Clusters of content portions are then determined based on the first set of feature values. The features values are optionally associated with topics. Structural links between the elements are determined based on a second set of feature values. A layout of the element is then determined based on the clusters and the structural links. Optionally the N-most dominant topics are determined and also used to inform the layout of the elements in a display.

21 Claims, 11 Drawing Sheets

| TOPIC IDENTIFIER 410 | TOPIC NAME 420 | TOPIC VECTOR 430 |
|---|---|---|
| 1 | /mac/modules | 1,4,8,7,6,9 |
| 2 | */lib/test | 1,5,15,20,31,6 |
| 3 | */Doc/lib | 3,2,8,4,8,7 |
| . | . | . |
| . | . | . |
| N | Code Discussion | 9,1,8,3,4,10 |

FIG. 4

| TEXT IDENTIFIER 510 | DISPLAY NAME 520 | TEXT VECTOR 530 |
|---|---|---|
| 1 | text[1].author | 9,2,8,4,5,10 |
| 2 | text[2].author | 1,5,15,20,31,7 |
| 3 | text[3].author | 3,2,8,4,10,7 |
| . | . | . |
| . | . | . |
| N | text[4].author | 1,5,9,8,7,10 |

FIG. 5

| TEXT IDENTIFIER | TOPIC IDENTIFIER |
|---|---|
| 1 | N |
| 2 | 2 |
| 3 | 3 |
| . | . |
| . | . |
| N | 1 |

SYSTEMS AND METHODS FOR THE COMBINATION AND DISPLAY OF SOCIAL AND TEXTUAL CONTENT

BACKGROUND OF THE INVENTION

1. Field of Invention

This invention relates to the display of information.

2. Description of Related Art

Conventional systems for social network analysis provide for analyzing relationships between multiple elements by associating each element with a node in a graph. The links between nodes represent relationships between the multiple elements. Where individuals are represented as nodes, the links typically represent binary or ordinal valued relationships between the individuals. However, real individuals are typically linked by more than one attribute or feature. These additional attributes or features are difficult to represent and/or process using the conventional tools of social network analysis.

SUMMARY OF THE INVENTION

Thus, systems and methods for the combination and display of social and textual content would be useful. The systems and methods according to this invention provide for determining a corpus of content portions, each content portion associated with at least one element. A first set of feature values is determined for each content portion. Clusters of content portions are then determined based on the first set of feature values. The features values are optionally associated with topics. Structural links between the elements are determined based on a second set of feature values. A layout of the elements is then determined based on the clusters and the structural links. Optionally the N-most dominant topics are determined and used to inform the layout of the elements in a display and/or visualization.

BRIEF DESCRIPTION OF THE DRAWINGS

FIG. 4 is an exemplary data structure for storing topic cluster information according to an aspect of this invention;

FIG. 5 is an exemplary data structure for storing text vectors according to an aspect of this invention;

FIG. 6 shows an exemplary data structure for storing text categorizations according to one aspect of this invention;

FIG. 11 shows an exemplary graph layout according to another aspect of this invention.

DETAILED DESCRIPTION OF EXEMPLARY EMBODIMENTS

Figure 1:
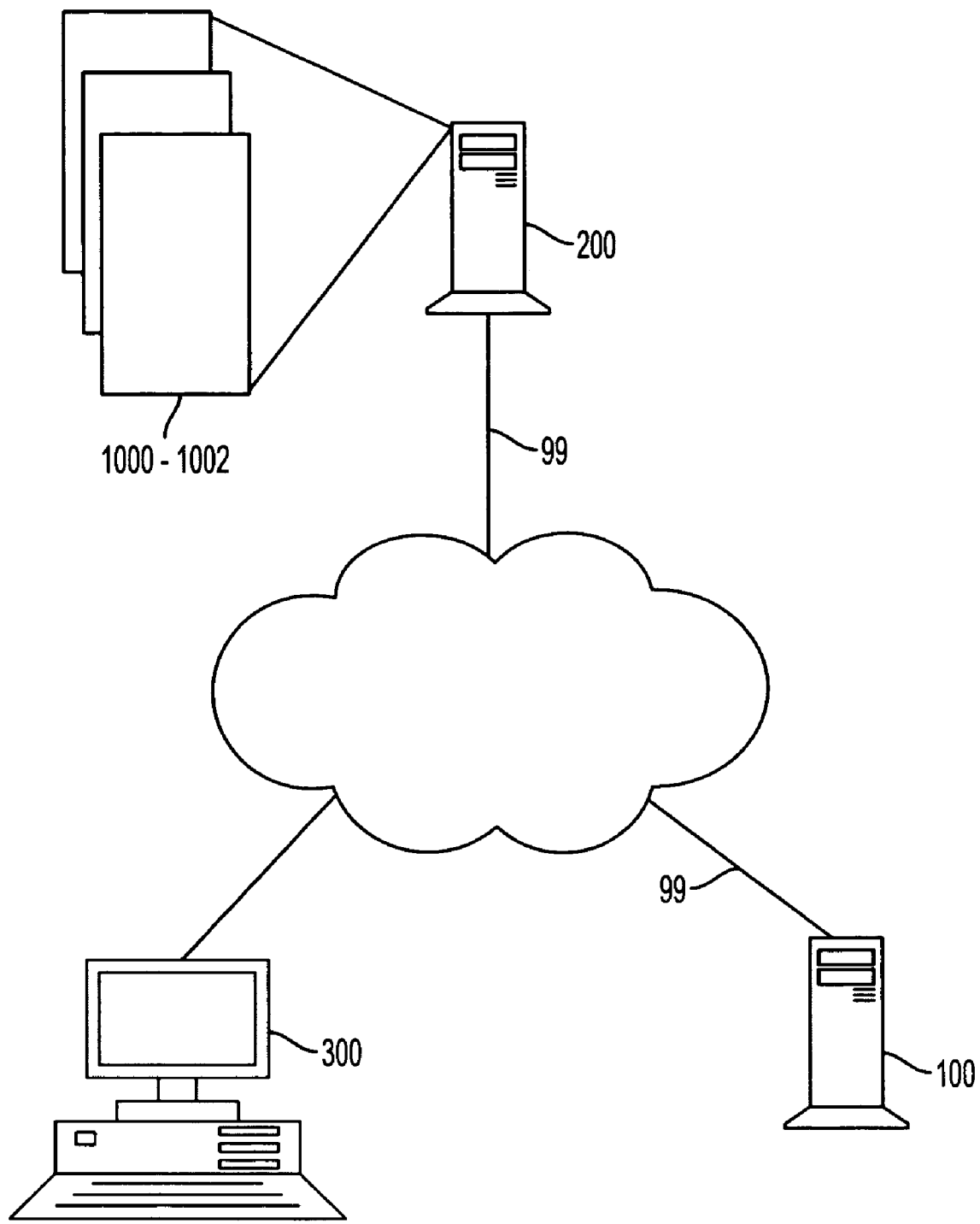
FIG. 1 shows an exemplary overview of a system for combining and displaying social and textual content according to an aspect of this invention.

FIG. 1 shows an exemplary overview of a system for combining and displaying social and textual content 100 according to an aspect of this invention. The system for combining and displaying social and textual content 100 is connected via communications links 99 to: an information repository 200 providing access to documents 1000-1002; and to a communications-enabled personal computer 300.

In one exemplary embodiment, a user of the communications-enabled personal computer 300 initiates a request for a visualization of the combined social and textual content of the documents in the collection 1000-1002. The visualization request is forwarded over the communications links 99 to the system for combining and displaying social and textual content 100. The system for combining social and textual content 100 receives the request and acts as a proxy to retrieve the documents or content portions 1000-1002 from the information repository 200 over the communications links 99. In various embodiments, the content portions are documents, messages, software code modules and or any other portion of content.

The system for combining and displaying social and textual content 100 determines the elements associated with each content portion. A first set of feature values is then determined based on the elements. The content portions are clustered based on the determined set of elements. A set of content portion indicators are determined. Structural links between the content portion indicators are determined based on a second set of feature values. A layout of the content portion indicators is determined based on the determined clusters of content portions and the determined structural links. In various exemplary embodiments according to this invention, the first set of feature values are textual elements drawn from the content portions and topics determined from clustering of the various content portions. A second set of feature values is used to define the structural links between the content portions and indicates the types and strength of inter-relationships between the content portions.

For example, in one exemplary embodiment, access logs are mined to determine whether content portions reference each other, whether a common entity accessed the access logs or the like. The content portion indicators are laid out based on the topics and the links to provide a topic and structurally oriented visualization of the information.

Figure 2:
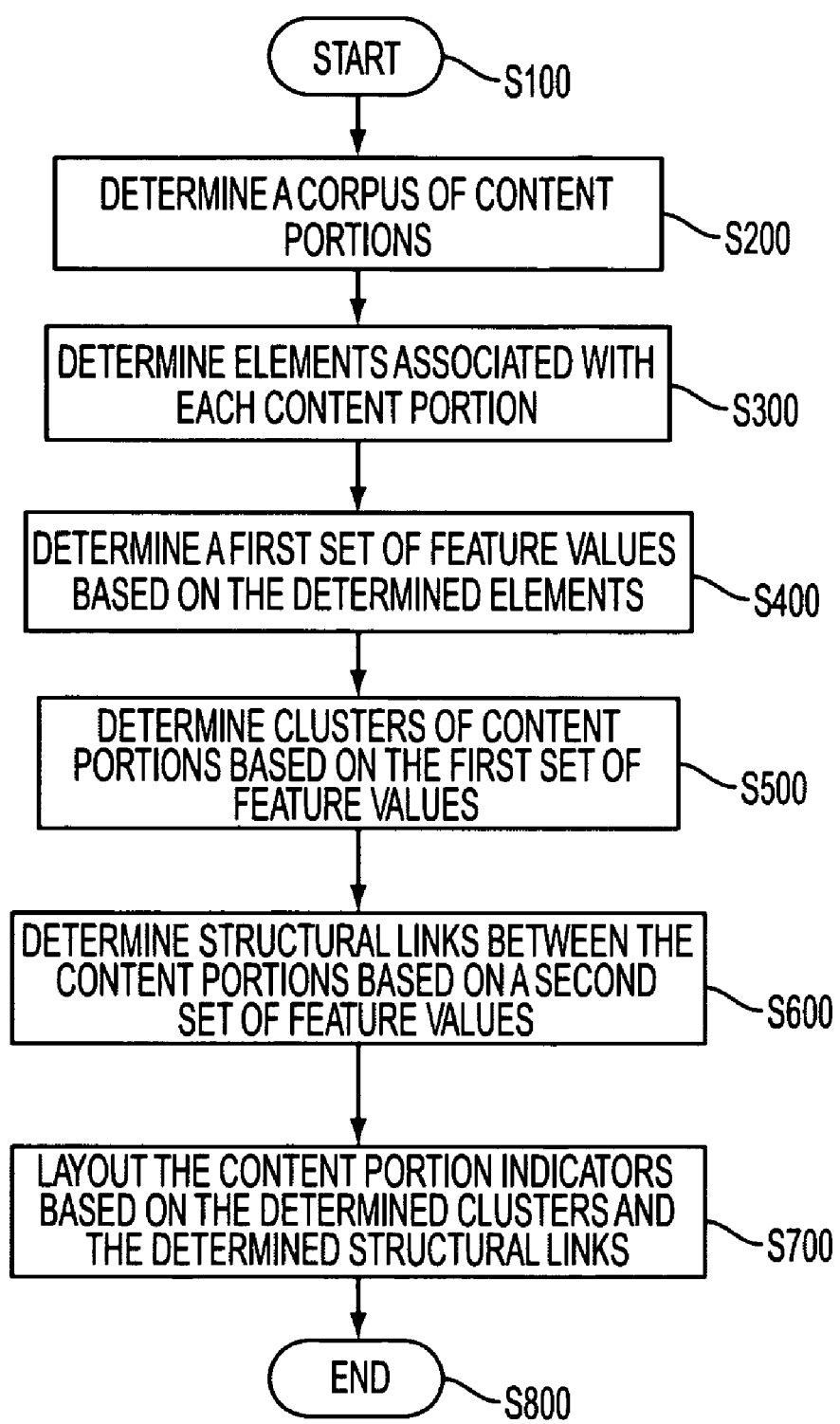
FIG. 2 is a flowchart of a first exemplary method for combining and displaying social and textual content according to an aspect of this invention.

FIG. 2 is a flowchart of a first exemplary method for combining and displaying social and textual content according to an aspect of this invention. The process begins at step S100 and immediately continues to step S200.

In step S200, a corpus of content portions is determined. In various exemplary embodiments according to this invention, the content portions are text and/or messages contained within an information repository. The texts are associated with one or more entities. The information repository may be a database, a set of documents served by an http server and/or various other known or later developed information sources. For example, in one embodiment the content portions are code pages of computer program code. The transaction logs indicate users who have accessed the source code content portions. After the content portions have been determined, control continues to step S300.

In step S300, the elements associated with each content portion are determined. For example, in one exemplary embodiment, the elements are words, named entities and/or other recognizable structures within the content portion. After the elements within the content portions have been determined, control continues to step S400.

A first set of feature values is determined based on the determined elements in step S400. Thus, for example word stemming, lemmatization and/or other transformations are applied to the elements to determine a set of feature values. After the first set of feature values has been determined, control continues to step S500.

In step S500, clusters of content portions are determined based on the first set of feature values. In one exemplary embodiment according to this invention, topic clusters are used to indicate dominant topics for the associated content portions. However, it will be apparent that other types of clusters may also be determined from content portions features without departing from the spirit or scope of this invention. Control then continues to step S600.

Structural links between the content portions are determined based on a second set of feature values in step S600. Thus, in some cases, additional icons or nodes based on derived and/or other information are added to the set of content portion icons. In one exemplary embodiment, additional icons are derived from an analysis of the access pattern information elements associated with each content portion. Additional icons are associated with the users accessing the content portions. The access information is also used to determine structural links between the content portion icons and the additional icons. After the structural links between the content portion icons have been determined, control continues to step S700.

In step S700, a layout of the content portion icons and the additional icons is determined based on the determined clusters and the structural links. This provides a multi-variable visualization of the content portion icons that preserves the pair-wise relationship context between elements within the context of the determined clusters. After the layout is determined, the graph is displayed. Control then continues to step S800 and the process ends and/or repeats with new content portions.

Figure 3:
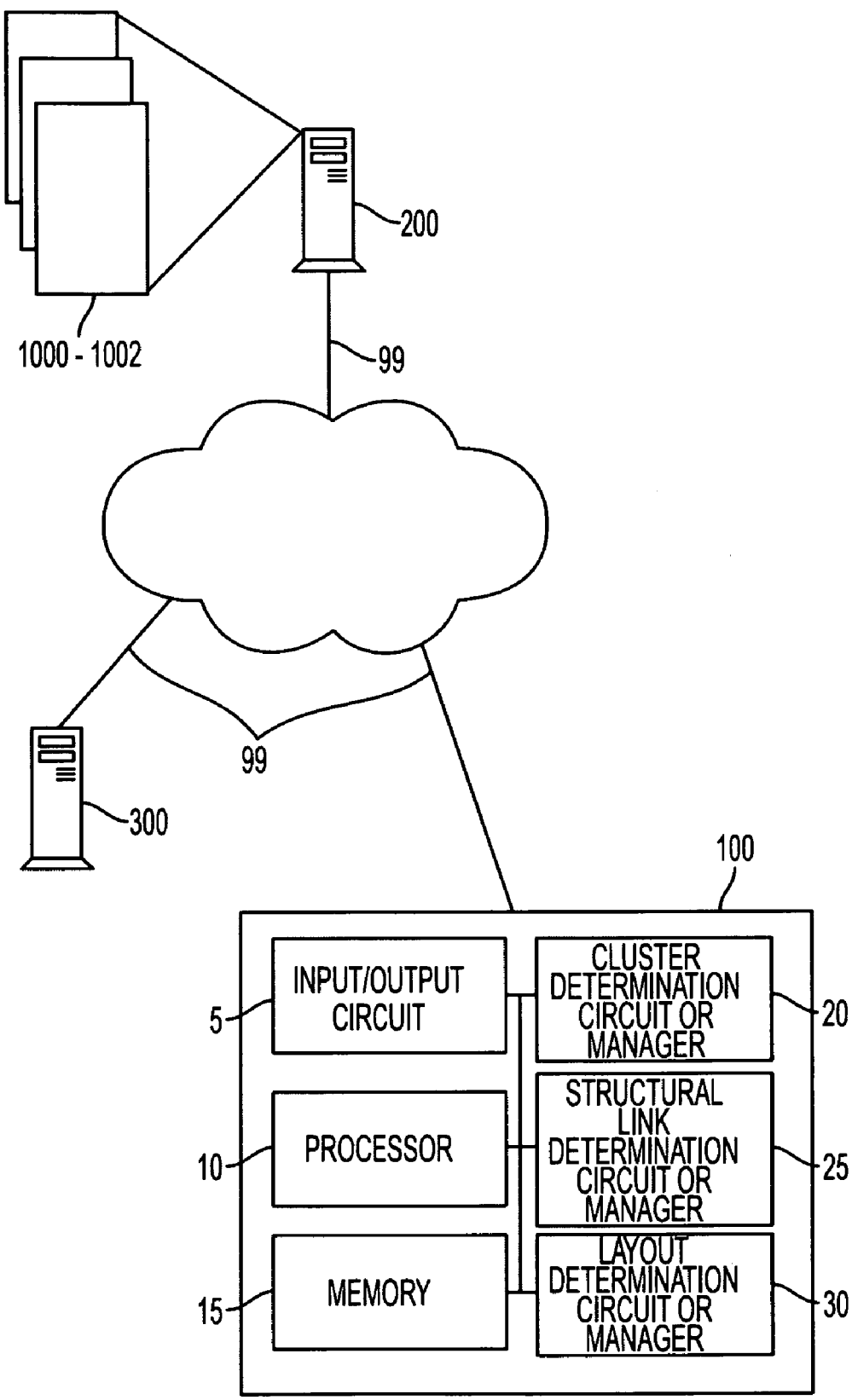
FIG. 3 is an exemplary system for combining and displaying social and textual content according to this invention.

FIG. 3 is an exemplary system for combining and displaying social and textual content 100 according to this invention. The system for combining and displaying social and textual content 100 is connected to an information repository 200 providing access to documents 1000-1002 and to a communications-enabled personal computer 300 via the communications links 99.

In one exemplary embodiment, a user of the communications-enabled personal computer 300 initiates a request for a visualization of the social and textual content of the documents in the collection 1000-1002. The request is forwarded over the communications links 99 to the system for combining and displaying social and textual content 100. The processor 10 of the system for combining and displaying social and textual content 100 activates the input/output circuit 5 to retrieve the documents 1000-1002 via the communications links 99.

The processor 10 determines the elements for each document retrieved from the information repository 200. Word stemming, lemmatization and/or other transformations are applied to the elements to determine a set of feature values.

The processor 10 then activates the cluster determination circuit or manager 20 to cluster retrieved documents based on the first set of feature values. For example, in one exemplary embodiment according to this invention, topic clusters indicating the dominant topics for the documents are determined. However, it should be apparent that the document may be clustered using various other criteria without departing from the spirit or scope of this invention.

The processor 10 the activates the structural link determination circuit or manager 25 to determine structural links between the documents based on a second set of feature values. For example, in one exemplary embodiment, additional information such as user access patterns, document cross references or the like are identified. The processor then activates the layout determination circuit or manager 30 to layout a graph of the content portion icons based on the determined clusters and structural links. This provides a visualization of the content portion icons within the context of the determined cluster information.

FIG. 4 is an exemplary data structure for storing topic cluster information 400 according to an aspect of this invention. The data structure for storing topic cluster information 400 is comprised of a topic identifier portion 410, a topic name portion 420, and a topic vector portion 430.

The first row of the topic data structure for storing topic cluster information contains the values "1", "/mac/modules", and "1, 4, 8, 7, 6, 9". The value "1" in the topic identifier portion 410 provides an identifier for uniquely specifying the topic cluster within the system for combining and displaying social and context information. The value "/mac/modules" contained in the topic name portion 420 indicates the name of the associated topic. Thus, in one exemplary embodiment, the names are derived from the path and file name of the content portion. The value "1, 4, 8, 7, 6, 9" in the topic vector portion 430 indicates a characteristic 6 dimensional vector representing the topic cluster. Additional messages are then associated with specific clusters by determining a 6 dimensional vector for the message and identifying the closest cluster using Euclidean distance measures or the like.

The second row of the topic data structure for storing topic cluster information contains the values "2", "*/lib/test", and "1, 5, 15, 20, 31, 6". The value "2" uniquely identifies the topic cluster within the system for combining and displaying social and context information. The value "*/lib/test" in the topic name portion 420 indicates the name of the associated topic as "*/lib/test" based on the path and file name of the content portion. The value "1, 5, 15, 20, 31, 6" in the topic vector portion 430 indicates the characteristic 6 dimensional vector representing the topic cluster.

The third row of the topic data structure for storing topic cluster information contains the values "3", "*/Doc/lib", and "3, 2, 8, 4, 8, 7". The value "3" uniquely identifies the topic cluster while the "*/Doc/lib" value in the topic name portion 420 identifies the topic name as "*/Doc/lib". The "3, 2, 8, 4, 8, 7" value in the topic vector portion 430 indicates the characteristic 6 dimensional vector representing the topic cluster.

The final row of the topic data structure for storing topic cluster information contains the values "N", "Code Discussion", and "9, 1, 8, 3, 4, 10". The "N" value uniquely identifies the topic cluster. The "Code Discussion" value in the topic name portion 420 identifies the topic name and the "9, 1, 8, 3, 4, 10" value in the topic vector portion 430 indicates a characteristic 6 dimensional vector representing the specified topic cluster.

FIG. 5 is an exemplary data structure for storing text vectors 500 according to an aspect of this invention. The exemplary data structure for storing text vectors 500 is comprised of a text identifier portion 510, a display name portion 520, and a text vector portion 530.

The first row data structure for storing text vectors 500 contains the value "1" in the text identifier portion 510. This value identifies the text within the system. However, it will be apparent that various types of text identifier may be used without departing from the spirit or scope of this invention.

The display name portion 520 of the data structure for storing text vectors 500 contains the value "text[1].author". This value indicates the display name that will be associated with the text in any visualization or display of the information. In this case, an author field associated with the text is used as the label. However, it will be apparent that other known or later developed labels may also be used without departing from the scope of this invention.

The text vector portion 530 of the data structure for storing text vectors 500 contains the value "9, 2, 8, 4, 5, 10" indicating a 6 feature vector that characterizes the text. The vector is compared to cluster vectors to determine a categorization of the text. The associated display name can be used to label the icon in the graph layout.

The second row contains the value "2", in the text identifier portion 510 of the exemplary data structure for storing text vectors 500. This provides a unique identifier of the text to the system. The display name portion 520 contains the value "text[2].author" indicating that the author field of the text should be used as the display name or label for the text. The text vector portion 530 contains the value "1, 5, 15, 20, 31, 7". This facilitates the categorization of the text into topics and/or other types of clusters.

The third row contains the value "3" in the text identifier portion 510 uniquely identifying the text as text "3". The display name portion 520 contains the value "text[3].author". This value indicates that the author field of the text will be used as the display name or label for the text in visualizations. The text vector portion 530 contains the value "3, 2, 8, 4, 10, 7" indicating a vector which characterizes the text.

The last row contains the value "N" in the text identifier portion 510. This value uniquely identifies the text within the system. The display name portion 520 contains the value "text[4].author". This value indicates the text field to be used in visualizations. The text vector portion contains the value "1, 5, 9, 8, 7, 10" indicating a vector that characterizes the text.

FIG. 6 shows an exemplary data structure for storing text categorizations 600 according to one aspect of this invention. The exemplary data structure for storing text categorizations 600 is comprised of a text identifier portion 610 and a topic identifier portion 620.

The first row of the exemplary data structure for storing text categorizations 600 contains the value "1" in the text identifier portion 610. This indicates that the text is uniquely identified as text "1" within the system. The topic identifier portion 620 contains the value "N" indicating that topic N, associated with cluster N most closely matches the text identified as text "1".

The second row of the exemplary data structure for storing text categorizations 600 contains the values "2" and "2" in the text identifier portion 610 and the topic identifier portion 620. These values indicate that text "2" is most closely identified with topic "2" which in turn is associated with topic cluster "2".

The third row of the exemplary data structure for storing text categorizations 600 contains the values "3" and "3" in the text identifier portion 610 and the topic identifier portion 620. These values indicate that text "3" is most closely identified with topic "3" which in turn is associated with topic cluster "3".

The last row contains the values "N" and "1" in the text identifier portion 610 and the topic identifier portion 620. These values indicate that text "N" is most closely identified with topic "1" which in turn is associated with topic cluster "1".

Figure 7:
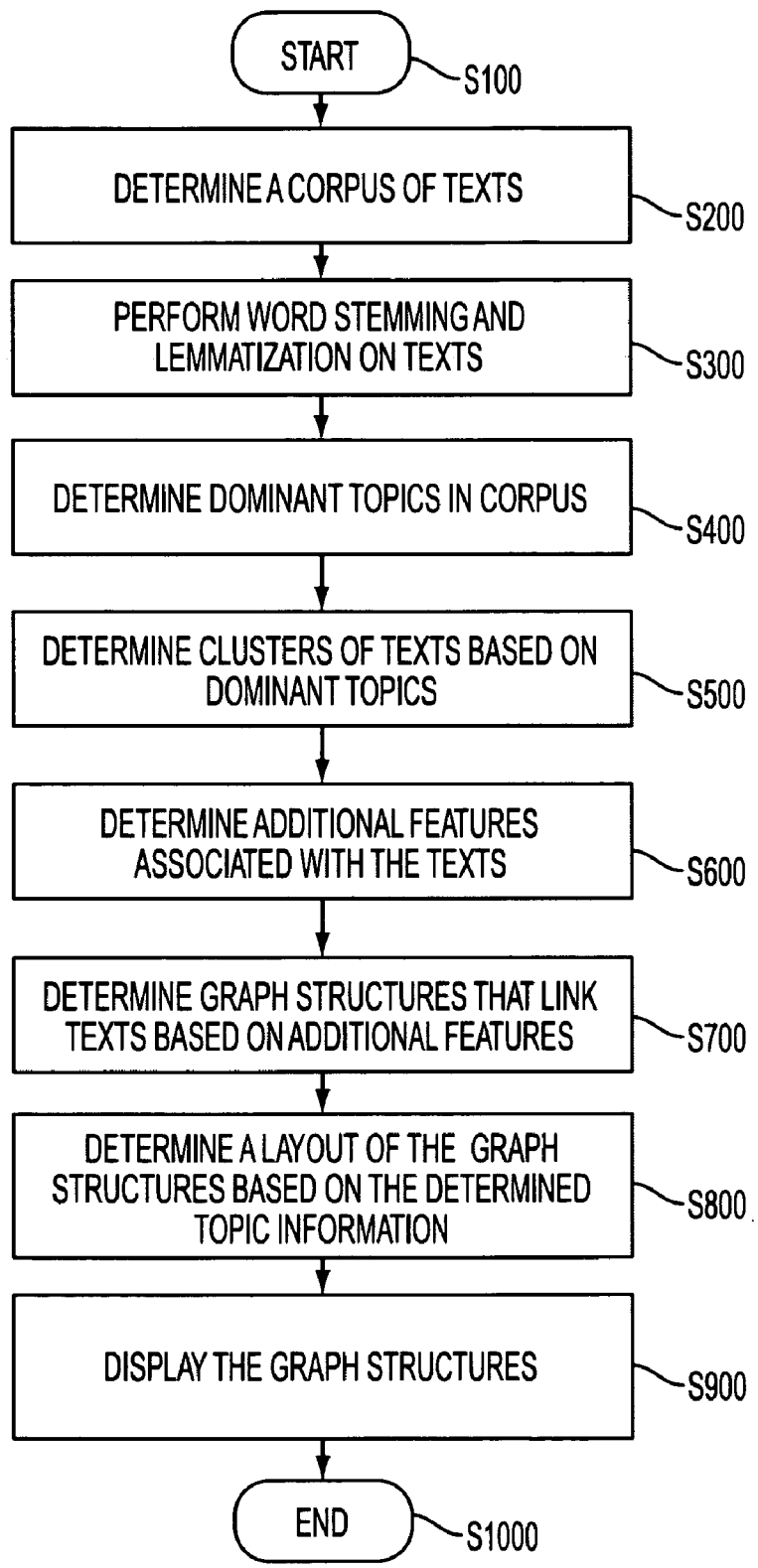
FIG. 7 is a flowchart of a second exemplary method for combining and displaying social and textual content according to an aspect of this invention.

FIG. 7 is a flowchart of a second exemplary method for combining and displaying social and textual content according to an aspect of this invention. The process begins at step S100 and continues to step S200.

In step S200, a corpus of texts is determined. The corpus of texts may include mail archives, software code libraries and/or various other types of corpora. After the corpus of texts has been determined, control continues to step S300.

Word stemming and lemmatization of the texts is performed in step S300. Word stemming allows words sharing the same word stem but differing in the suffix to be mapped to the same concept word. The words in each text are identified and word stemming and/or lemmatization performed. The resultant set of word stems and lemmas provide an overall description of the text. Control then continues to step S400.

In step S400, dominant topics for the corpus of texts are determined. In some exemplary embodiments according to this invention, the dominant topics are the words and/or lemmas with the highest frequency count across the corpus of texts. In some embodiments according to this invention, the dominant topics provide cognitive anchors for the information display. Thus, for a conventional video display terminal, four dominant topics are generally selected for mapping to the four corners of the display. However, it will be apparent that other dominant topic to device mappings may also be used in the practice of this invention. After the dominant topics have been determined, control continues to step S500.

Clusters of texts are determined based on the dominant topics in step S500. For example, in some embodiments, representative vectors are determined for each dominant topic and for each text. In some embodiments, the vectors are clustered based on their similarity to a dominant topic. It will be apparent that various methods of determining similarity such as Euclidean distance and the like may also be used without departing from the spirit or scope of this invention. After the clusters have been determined, control continues to step S600.

In step S700, graph structures that link the texts based on additional features are determined. The graph structure may include, but are not limited to trees, directed graphs or any other graph structure that link the additional features. For example, icons associated with the individuals who have accessed a specific text are determined. Links between the icons representing the individuals and icons associated with the selected text may, for example, indicate an edit of the text. After the graph structure have been determined, control continues to step S800.

A layout of the graph structures based on the determined topic information is then determined. That is, the determined topic information is used to inform the layout of the icons. This provides a topic context for the display of the icons allowing additional relationships to be more easily identified. After the layout has been determined, control continues to step S900. In step S900 the graph structures are displayed based on the layout. Control then continues to step S1000 and the process ends.

Figure 8:
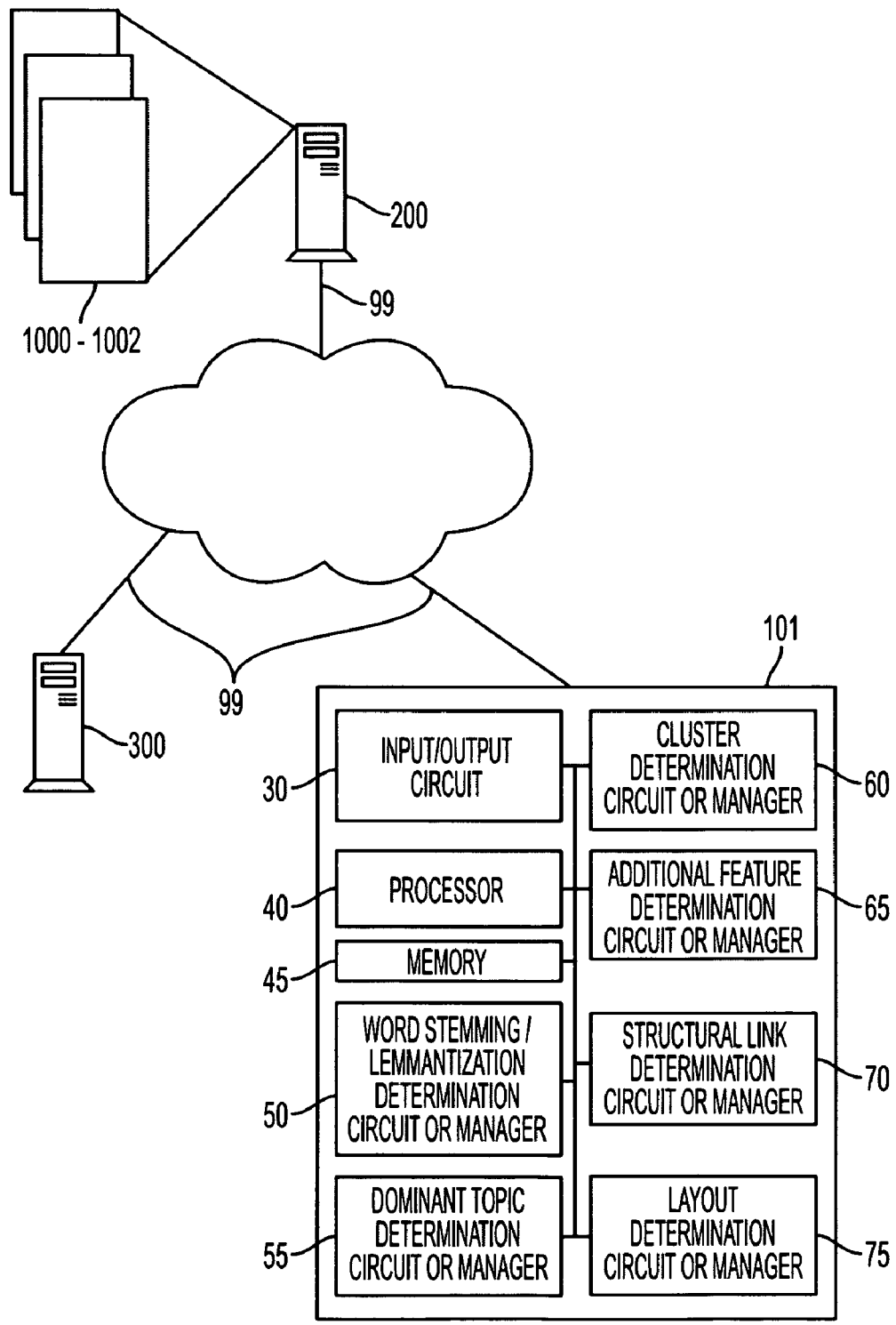
FIG. 8 is a second exemplary system for combining and displaying social and textual content according to an aspect of this invention.

FIG. 8 is a second exemplary system for combining and displaying social and textual content according to an aspect of this invention. The system for combining and displaying social and textual content 101 is connected to an information repository 200 providing access to documents 1000-1002 and to a communications-enabled personal computer 300 via the communications links 99.

In one exemplary embodiment, a user of the communications-enabled personal computer 300 initiates a request for a visualization of the social and textual content of the documents in the collection 1000-1002. The request is forwarded over the communications links 99 to the system for combining and displaying social and textual content 101. The processor 40 of the system for combining and displaying social and textual content 101 activates the input/output circuit 35 to retrieve the documents 1000-1002 via the communications links 99.

The processor 40 determines the elements for each document retrieved from the information repository 200. The word stemming/lemmatization circuit or manager 50 is activated to determine word stems, lemmatize and/or other perform other transformations on the elements to determine a first set of feature values. The processor 40 determines topics based on the first set of feature values.

The cluster determination circuit or manager 60 is then activated to cluster retrieved documents based on the first set of feature values. The dominant topic determination circuit or manager 55 then identifies a set of N-dominant topics from the determined topics. The processor 40 activates the additional feature determination circuit or manager 65 to determine a set of additional features associated with the documents.

The processor 40 activates the structural link determination circuit or manager 70 to determine structural links between documents based on a set of additional feature values. For example, in one exemplary embodiment, additional information such as user access patterns, document cross references or the like are identified. The layout determination circuit or manager 75 is then activated to layout a graph of the content portion icons based on the determined clusters and structural links. This provides a visualization of the content portion icons within the context of the determined cluster information.

Figure 9:
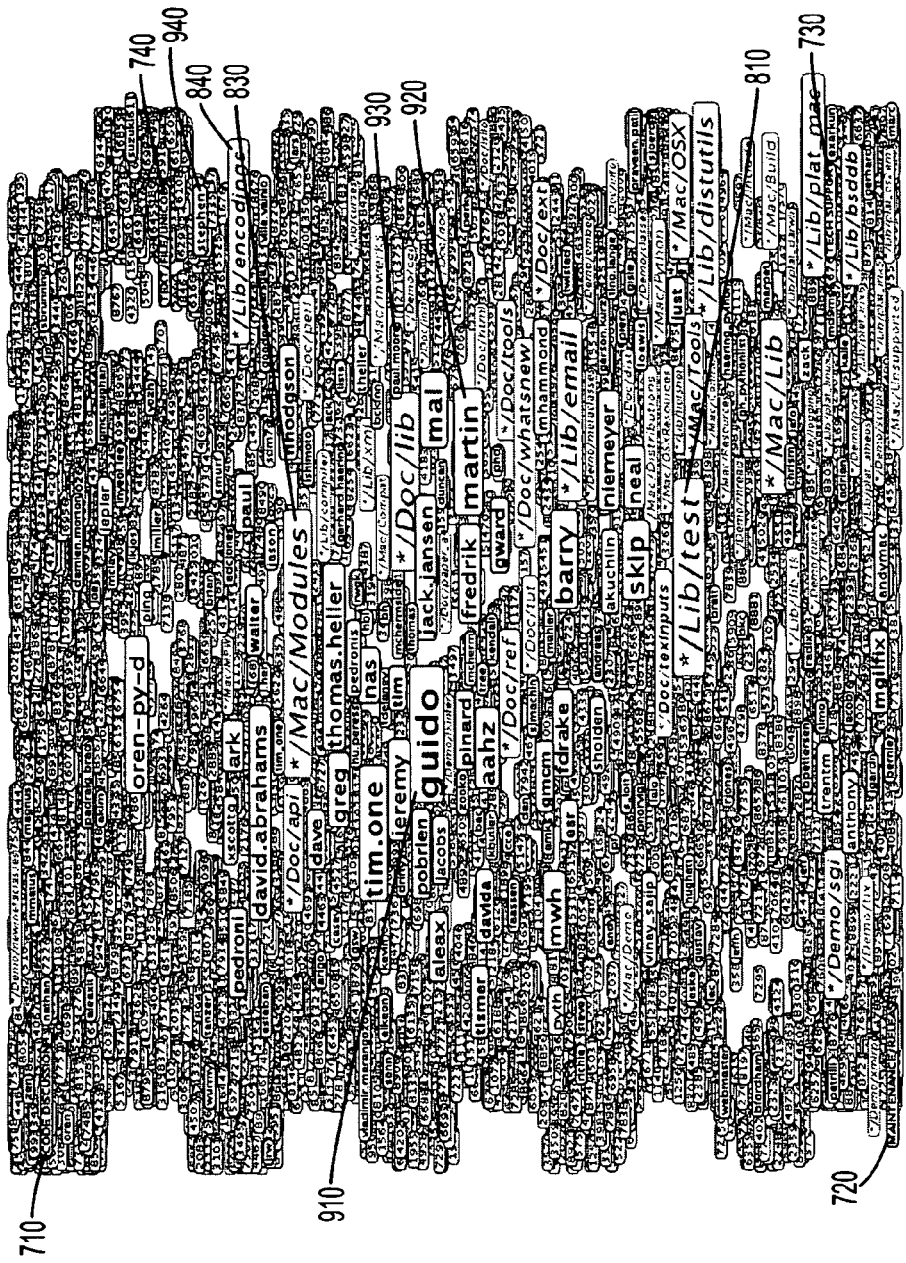
FIG. 9 show an exemplary visualization of social and textual content according to an aspect of this invention.

FIG. 9 show an exemplary visualization of social and textual content according to an aspect of this invention. A set of content indicators is identified for the content portions. Additional indicators are identified for derived information. For example, in one exemplary embodiment according to this invention, the names Guido, Martin and Mal are derived from the access logs of the information repository as names of the users interacting with one r more content portions of interest. Additional indicators or nodes are created and associated with the derived information.

The content portions are clustered based on the elements contained within the content portions. Topics and/or other structures or labels are associated with the determined clusters. Structural links between the content portions and any optional derived information are then determined based on an additional set of features. The placement of the content portions and the additional indicators is determined based on the topic or other label information.

For example, N-dimensional topic vectors characterizing the clusters of content portions are mapped to the 2-dimensional display space using a transformation that preserves pair-wise relationships. The transformations may include, but are not limited to, self organizing maps, Kohonen maps and/or any other multi-dimensional scaling transform that preserves pair-wise distances between the labeled clusters or topics.

The structural links between the content portions and the additional indicators provide a visualization of a set of inter-relating attributes or features while the layout organization provides a simultaneous visualization of a second set of attributes or features.

For example, in one exemplary embodiment, topic or structure labels 710-740 associated with the dominant topics "CODE DISCUSSION", "MAINTENANCE/RELEASE" "TECH SUPPORT" and "TEXT/FILE/UNICODE" are mapped to the four corners of the two dimensional display. Other topics or cluster labels 810-840 are placed into the two dimensional display using transformations that preserve the pair-wise relationships between the N-dimensional vectors that characterize each topic or cluster. Thus, the relationship of the topic or cluster labeled "*/Lib/test" 810 is placed closer to the dominant topic "MAINTENANCE /RELEASE" 720 and to the dominant topic "TECH SUPPORT" 730 than to the dominant topics "CODE DISCUSSION" 710 and "TEXT/FILE/UNICODE" 740. Conversely, the topic "*/Mac/Modules" 830 is placed closer to the dominant topics "CODE DISCUSSION" 710 and "TEXT/FILE/UNICODE" 740.

The topic or cluster labeled "*Doc/lib" 820 is situated almost equi-distant from the dominant topics indicating its inter-relationships with each while the topic or cluster labeled "*/Lib/encodings" 840 lies closer to the dominant "TEXT/FILE/UNICODE" 740 topic.

Access patterns and/or other information is then used to determine additional icons representing the user messages related to the PYTHON-DEV mailing list. In various embodiments, these icons are represented using different shapes of icons, different colors or by other display attributes.

For example, the additional icons 910-940 associated with "Guido", "Martin", "Mal", and "Stephen" respectively. The additional icons 910-940 are positioned within the context of the clustered topic information. Thus, Guido's additional icon 910 illustrates his central role within the Python development project. The placement slightly to the left in the visualization indicates a focus on the "CODE DISCUSSION" topic 710 and the MAINTENANCE/RELEASE" topic 720. Other major contributors include "Martin" and "Mal" who focus on the Unicode and Tech support areas as indicated by the placement of the martin and mal additional icons 920-30 midway between the "TEXT/FILE/UNICODE" dominant topic 740 and the "TECH SUPPORT" dominant topic 730 and slightly to the right hand side of the display midline.

Figure 10:
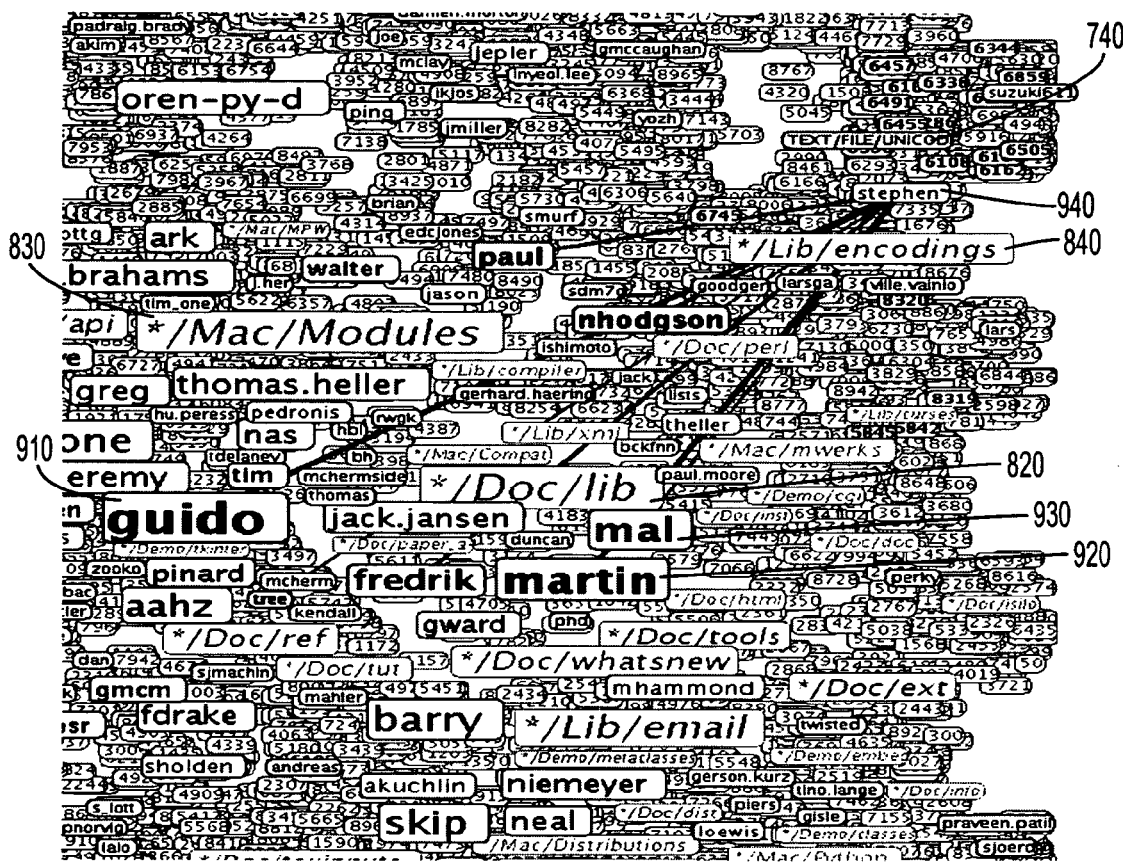
FIG. 10 shows an exemplary graph layout according to an aspect of this invention.

FIG. 10 shows an exemplary graph layout according to an aspect of this invention. The additional icon 940 for "Stephen" is close to the "TEXT/FILE/UNICODE" dominant topic 740. This indicates texts or messages within the Python-dev group would generally be categorized under the "TEXT/FILE/UNICODE" dominant topic 740. The structural links from the "Stephen" additional icon 940 indicate Python-dev messages sent or received between individuals represented by the additional icons 910-930. Thus, communication between "Stephen" and "Guido" is indicated by the link between the additional icons 910, 940 labeled "Stephen" and "Guido". The position of the "Guido" additional icon and other additional icons in relation to the topic labels provide a nuanced contextual view of individual interactions.

For example, although "Stephen's cumulative characterization lies closest to the "TEXT/FILE/UNICODE" dominant topic, the exemplary visualization indicates that significant communications occur between "Guido", "Martin" and "Mal". These individuals are not generally associated with the same topic as evidenced by their disparate placement. Thus, communications were likely related to an overlap of topical interests between "Guido", "Stephen", "Martin" and "Mal".

Figure 11:
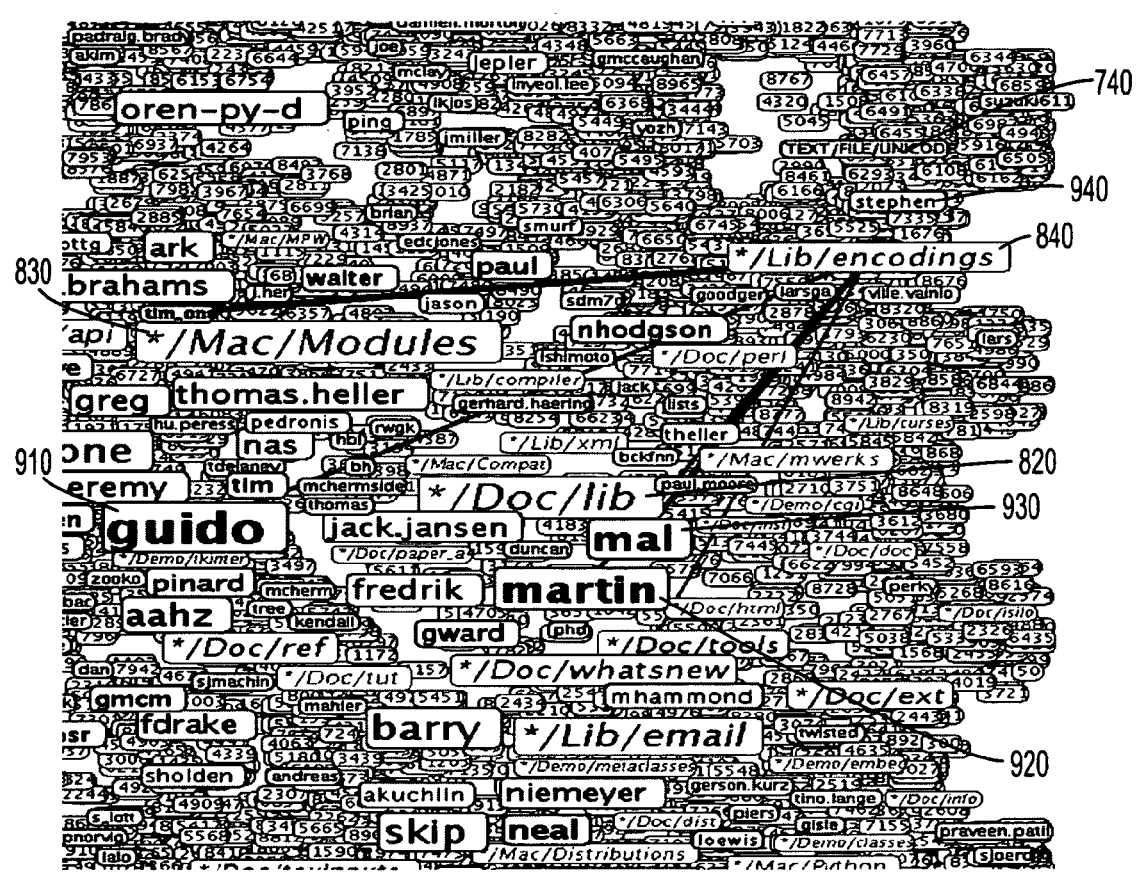

FIG. 11 shows an exemplary graph layout according to another aspect of this invention. The user has selected the "*/lib/encodings" topic icon 840. The links represent the number of CVS commits performed on the library by an individual. The width of each link indicates the number of CVS commits performed by the indicated individual. Each of the additional icons 910-930 appears within the context of the topics 710-740 and 810-830. This provides a nuanced view of the individual's likely actions within the "*/Lib/encodings" module.

Figure 12:
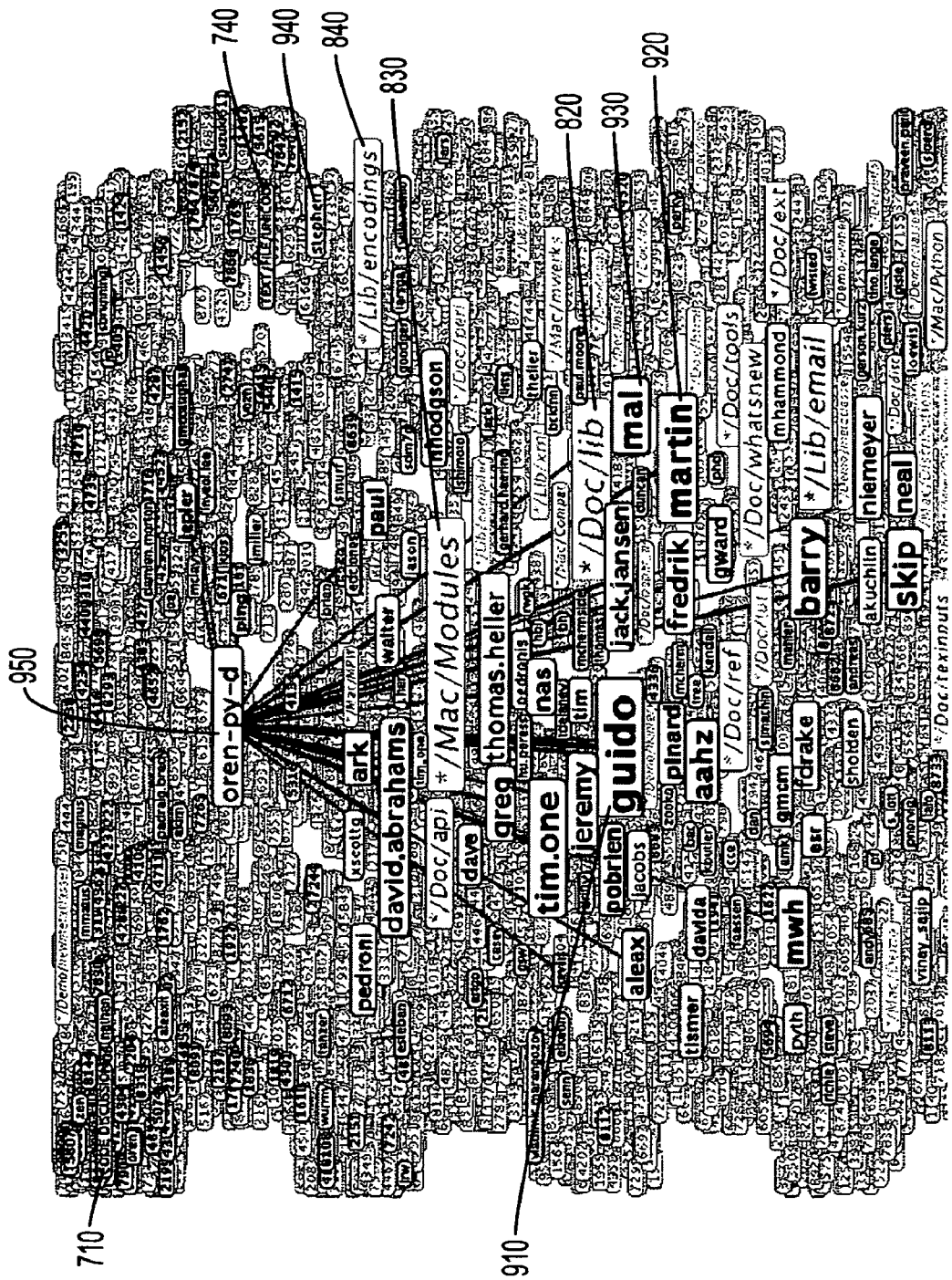
FIG. 12 shows an exemplary graph layout according to another aspect of this invention.

FIG. 12 shows an exemplary graph layout according to another aspect of this invention. The user selects the "oren-py-d" additional icon 950. This icon is associated with the individual "oren-py-d". The links between the "oren-py-d" additional icon 950 and other additional icons 910-940 represent communications between "oren-py-d" and a large number of other individuals. These other individuals are each associated with a wide range of topics likely reflecting the interest of "oren-py-d" in a wide range of topics. Thus, "oren-py-d" is recognized as a generalist rather than a specific subject matter expert.

In the various embodiments of the system for combining and displaying social and textual content 100-101, each of the circuits 5-75 outlined above can be implemented as portions of a suitably programmed general-purpose computer. Alternatively, 5-75 of the system for combining and displaying social and textual content 100-101 outlined above can be implemented as physically distinct hardware circuits within an ASIC, or using a FPGA, a PDL, a PLA or a PAL, or using discrete logic elements or discrete circuit elements. The particular form each of the circuits 5-75 of the system for combining and displaying social and textual content 100-101 outlined above will take is a design choice and will be obvious and predictable to those skilled in the art.

Moreover, the systems for combining and displaying social and textual content 100-101 and/or each of the various circuits discussed above can each be implemented as software routines, managers or objects executing on a programmed general purpose computer, a special purpose computer, a microprocessor or the like. In this case, the systems for combining and displaying social and textual content 100-101 and/or each of the various circuits discussed above can each be implemented as one or more routines embedded in the communications network, as a resource residing on a server, or the like. The systems for combining and displaying social and textual content 100-101 and the various circuits discussed above can also be implemented by physically incorporating the systems for combining and displaying social and textual content 100-101 into software and/or hardware system, such as the hardware and software systems of a web server or a client device.

As shown in FIGS. 3 and 8, memory 15 and 45 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1, 3 and 8, can each be any known or later developed device or system for connecting a communication device to the systems for combining and displaying social and textual content 100-101, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication.

Further, it should be appreciated that the communication links 99 can be wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A computer-implemented method for the combination and display of social and textual content comprising the steps of:
   determining a corpus of content portions;
   determining elements associated with the content portions;
   determining a first set of feature values based on the determined elements wherein the first set of feature values comprise at least one of:
      textual elements drawn from the content potions, and topics derived from the content portions;
   determining content indicators associated with the content portions;
   determining clusters of content portions based on the first set of feature values;
   determining structural links between the content portion indicators based on a second set of feature values:
      wherein the second set of feature values indicate a type and a strength of inter-relationships between the content portions associated with the content portion indicators;
   determining a mapping of the clusters of content portions onto the dimensions of a display device that preserve the pair-wise distances between clusters;
   determining a layout of the content portion indicators based on the structural links derived from the second set of feature values and the mapping of clusters derived from the first set of feature values; and
   displaying a graph of the content portion indicators based on the layout.

2. The method of claim 1, wherein the determining a mapping is based on multi-dimensional scaling.

3. The method of claim 2, wherein the multi-dimensional scaling is based on at least one of: a Kohonen map and a self-organizing map, such that the clustered content portions are transformed from N-dimensions to a 2-dimensional display space.

4. The method of claim 1, in which the clusters are determined based on a similarity metric.

5. The method of claim 4, in which the similarity metric is at least one of: Euclidian distance, and cosine distance.

6. The method of claim 1, in which the clustering is based on at least one of: Agglomerative clustering and k-means.

7. The method of claim 1, in which the texts are digital texts.

8. The method of claim 7, in which the digital texts are at least one of: messages, computer code, author identified papers and web pages.

9. The method of claim 1 wherein the determined clusters contain at least two distinct content portions.

10. The computer-implemented method of claim 1, wherein the structural links indicate the strength of inter-relationships between the content portions by varying the width of the edge representing structural link on the displayed graph.

11. A system for combining and displaying social and textual content comprising:
   an input/output circuit for determining a corpus of content portions;
   a microprocessor to execute the following functions:
      determine a corpus of content portions;
      determine elements associated with the content portions;
      determine a first set of feature values based on the determined elements, wherein the first set of feature values comprise at least one of:
         textual elements drawn from the content portions and topics derived from the content portions;
      determine content indicators associated with the content portions;
      determine clusters of content portions based on the first set of feature values;
      determine structural links between the content portion indicators based on a second set of feature values:
         wherein the second set of feature values indicate a type and a strength of inter-relationships between the content portions associated with the content portion indicators;
      determine a mapping of the clusters of content portions onto the dimensions of a display device that preserve the pair-wise distances between clusters;
      determine a layout of the content portion indicators based on the structural links derived from the second set of feature values and the mapping of clusters derived from the first set of feature values; and
      display a graph of the content portion indicators based on the layout.

12. The system of claim 1, wherein the determining a mapping is based on multi-dimensional scaling.

13. The system of claim 12, in which the multi-dimensional scaling is based on at least one of: a Kohonen map and a self-organizing map, such that the clustered content portions are transformed from N-dimensions to a 2-dimensional display device.

14. The system of claim , in which the clusters are determined based on a similarity metric.

15. The system of claim 14, in which the similarity metric is at least one of: Euclidean distance, and cosine distance.

16. The system of claim 1, in which the clustering is based on at least one of: Agglomerative clustering and k-means.

17. The system of claim , in which the texts are digital texts.

18. The system of claim 17, in which the digital texts are at least one of: messages, computer code, author identified papers and web pages.

19. The system of claim 1, wherein the clusters formed by the cluster determination circuit contain at least two distinct content portions.

20. The system of claim 1,
   wherein the first set of feature values are based on at least one of:
      word stemming,
      lemmatization, and
      text transformations; and
   wherein the second set of feature values is based on at least one of:
      inter-relationships between the content portion indicators.

21. A non-transient computer-readable storage medium having computer executable instructions for causing a computer to perform the steps of:
   determining a corpus of content portions;
   determining elements associated with the content portions;
   determining a first set of feature values based on the determined elements wherein the first set of feature values comprise at least one of:
      textual elements drawn from the content potions, and topics derived from the content portions;
   determining content indicators associated with the content portions;
   determining clusters of content portions based on the first set of feature values;
   determining structural links between the content portion indicators based on a second set of feature values:
      wherein the second set of feature values indicate a type and a strength of inter-relationships between the content portions associated with the content portion indicators;
   determining a mapping of the clusters of content portions onto the dimensions of a display device that preserve the pair-wise distances between clusters;
   determining a layout of the content portion indicators based on the structural links derived from the second set of feature values and the mapping of clusters derived from the first set of feature values; and
   displaying a graph of the content portion indicators based on the layout.

* * * * *